Jan. 5, 1926.
M. ROEMER
VENTILATED SEAT
Filed July 5, 1922
1,568,471
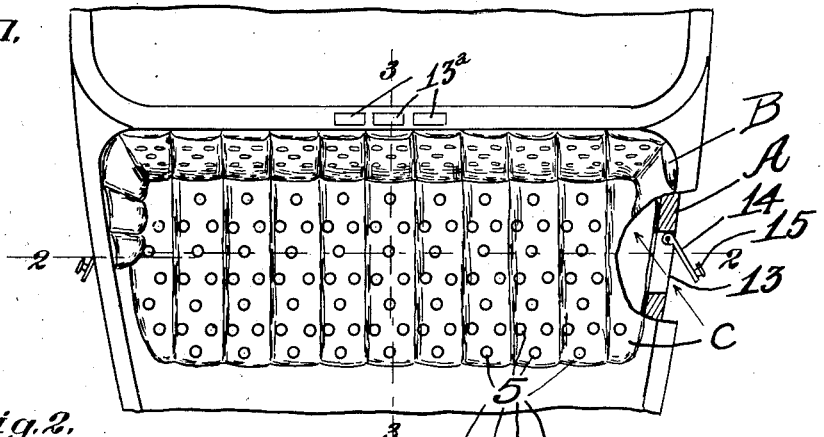
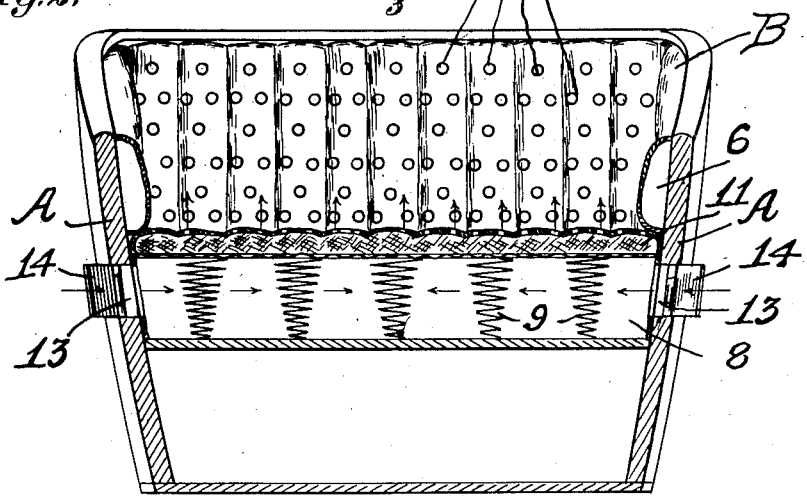
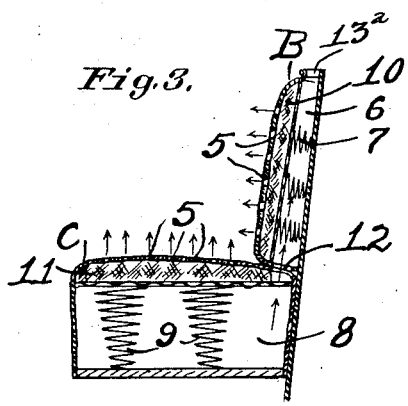
Inventor.
M. Roemer
By
Attorney.

Patented Jan. 5, 1926.

1,568,471

UNITED STATES PATENT OFFICE.

MAX ROEMER, OF LOST HILLS, CALIFORNIA.

VENTILATED SEAT.

Application filed July 5, 1922. Serial No. 573,041.

*To all whom it may concern:*

Be it known that I, MAX ROEMER, a citizen of the United States, and resident of Lost Hills, county of Kern, and State of California, have invented a new and useful Ventilated Seat, of which the following is a specification.

My invention relates in general to seat constructions such as commonly employed in motor and other vehicles or even railroad coaches, chair cars and other conveyances and has reference more particularly to improved means for ventilating such seats to aid in keeping the occupant cool by drafts of air in summer weather.

The invention possesses several characteristic features and advantages which will appear as the description now proceeds with reference to the illustrative embodiment of the idea as shown in the accompanying drawing in which:

Figure 1 is a view in plan of an ordinary seating arrangement for motor vehicles illustrating the application of the invention.

Figure 2 is a view in cross section on the line 2—2 of Figure 1, and

Figure 3 is a cross section on the line 3—3 of Figure 1.

Referring now to the drawing in detail, A represents a side of the vehicle body and B the back of the seat, while C represents the seat cushion. According to the preferred embodiment of my invention I propose to provide a multiplicity of perforations or openings such as 5 in the upholstery of the back of the seat B as well as in the upholstery of the seat cushion C.

By referring now to Figure 3 the construction will be more clearly identified. In all seat constructions at least for the purpose of the present invention a space 6 is left around the springs 7 for the back of the seat B and a similar space is left beneath the seat cushion C and around the springs 9 therefor. The padding 10 for the back of the seat B as well as the padding 11 for the seat cushion C is usually of hair or other coarse texture material loosely compressed so that air may penetrate the same and I therefore propose to permit a circulation of air from the spaces 6 and 8 through the paddings 10 and 11 and the perforations 5 in the upholstery. I further prefer to connect the space 6 with the space 8 so that they may communicate to enable a free circulation of air between them by making an opening as at 12.

As a further means for creating the desired circulation of air I can cut openings as at 13 on opposite sides of the body A to lead into the space 8 and in order to control the effective intake area of the openings I propose to provide hinged doors or panels 14, each having knobs 15 so that they may be manipulated to and from closing relation relative to the openings. In cool weather when the ventilating feature of the seat is not required the doors may be closed, so as to cut off the circulation.

As still another means of assuring the intake of sufficient air in the spaces 6 and 8 I can provide extra intake openings as at 13ª in the top of the back of seat B.

From the above it will be seen that I have provided a very simple and convenient means for realizing the results required and the construction of the same does not necessarily interfere with the conventional arrangement of the seat or otherwise affect the use of the same.

I claim:

A ventilated seat comprising a frame including upright opposite side and back members, the former of which are provided with air inlets and the latter having an overhanging upper edge provided with an air outlet, a partition connected to the side and back members and disposed to one side of the air inlets, a perforated seat cushion between the side members and above the partition to form a compartment, a back cushion disposed between the seat cushion and the overhanging upper edge of the back member and secured thereby, said back cushion being disposed in spaced relation to the back member and cooperating with the latter to form a compartment having communication with said first named compartment, said back cushion having perforations whereby free passage for the circulation of air is permitted between the said inlets and outlet and through said perforated cushions.

June 24th, 1922.

MAX ROEMER.